(12) United States Patent
Derscheid et al.

(10) Patent No.: US 11,519,429 B2
(45) Date of Patent: Dec. 6, 2022

(54) HYDRAULIC SYSTEM FOR BALER IMPLEMENT GATE

(71) Applicant: DEERE & COMPANY, Moline, IL (US)

(72) Inventors: Daniel E. Derscheid, Hedrick, IA (US); Austin J. Jones, Ottumwa, IA (US)

(73) Assignee: DEERE & COMPANY, Moline, IL (US)

(*) Notice: Subject to any disclaimer, the term of this patent is extended or adjusted under 35 U.S.C. 154(b) by 211 days.

(21) Appl. No.: 16/855,718

(22) Filed: Apr. 22, 2020

(65) Prior Publication Data

US 2021/0332832 A1 Oct. 28, 2021

(51) Int. Cl.
*F15B 11/042* (2006.01)
*A01F 15/07* (2006.01)
(Continued)

(52) U.S. Cl.
CPC .......... *F15B 11/0423* (2013.01); *A01F 15/07* (2013.01); *A01F 15/0883* (2013.01); *F15B 1/26* (2013.01); *F15B 11/10* (2013.01); *F15B 2211/45* (2013.01); *F15B 2211/63* (2013.01); *F15B 2211/6654* (2013.01); *F15B 2211/7053* (2013.01); *F15B 2211/75* (2013.01)

(58) Field of Classification Search
CPC .......... F15B 2211/75; F15B 2211/7053; F15B 2211/6654; F15B 1/26; F15B 11/0423; F15B 2211/45; A01F 15/0883; A01F 15/07
USPC .......................................... 29/454
See application file for complete search history.

(56) References Cited

U.S. PATENT DOCUMENTS

| 3,802,318 A | 4/1974 | Sibbald |
| 5,284,083 A | 2/1994 | Vaslin |

(Continued)

FOREIGN PATENT DOCUMENTS

| EP | 1444882 A2 | 8/2004 |
| EP | 2183957 A1 | 5/2010 |

(Continued)

OTHER PUBLICATIONS

Extended European Search Report and Written Opinion issued in European Patent Application No. 21167875.0, dated Sep. 22, 2021, 8 pages.

(Continued)

*Primary Examiner* — Thomas E Lazo
*Assistant Examiner* — Daniel S Collins (57) ABSTRACT

A hydraulic system for a rear gate of a baler implement includes a fluid circuit having a first portion connected to and disposed in fluid communication with a first fluid port of a hydraulic cylinder. A flow bypass assembly is disposed in the first portion of the fluid circuit. The flow bypass assembly includes a flow rate control valve selectively moveable between a first position allowing fluid communication therethrough at a first flow rate, and a second position blocking fluid communication therethrough. The flow bypass assembly further includes a bypass passageway for circulating the fluid when the flow rate control valve is closed. A flow restriction is disposed within the bypass passageway to provide a second flow rate that is less than the first flow rate.

26 Claims, 6 Drawing Sheets

(51) Int. Cl.
*A01F 15/08* (2006.01)
*F15B 1/26* (2006.01)
*F15B 11/10* (2006.01)

(56) References Cited

U.S. PATENT DOCUMENTS

| | | |
|---|---|---|
| 10,378,260 B2 | 8/2019 | Smith |
| 2015/0143791 A1 | 5/2015 | Smith et al. |
| 2017/0290271 A1 | 10/2017 | Jones et al. |

FOREIGN PATENT DOCUMENTS

| | | | |
|---|---|---|---|
| EP | 2875716 A1 | 5/2015 | |
| GB | 1582675 A | 1/1981 | |
| JP | S63163503 U | 10/1988 | |
| WO | WO-2019030704 A1 * | 2/2019 | ............. A01F 15/07 |

OTHER PUBLICATIONS

Extended European Search Report and Written Opinion issued in European Patent Application No. 21167873.5, dated Sep. 21, 2021, 8 pages.

* cited by examiner

HYDRAULIC SYSTEM FOR BALER IMPLEMENT GATE

TECHNICAL FIELD

The disclosure generally relates to a hydraulic system for a baler implement.

BACKGROUND

A baler implement, e.g., a round baler, includes a body and a rear gate rotatably attached to the body. The body forms a baling chamber within which crop material is formed into a bale. The rear gate is moveable between a closed position for forming the bale, an open position for discharging the bale from the baling chamber, and at least one intermediate position disposed between the open position and the closed position. A hydraulic system is used to actuate the rear gate. The hydraulic system includes a hydraulic cylinder that interconnects the body and the rear gate. The hydraulic cylinder extends and retracts in response to a fluid signal to move the rear gate between the open position and the closed position. The speed at which the rear gate moves is dependent upon the flow rate of the fluid signal.

SUMMARY

A hydraulic system for operating a rear gate of a baler implement is provided. The hydraulic system includes a tank operable to store a supply of a fluid, and a pump disposed in fluid communication with the tank. The pump is operable to circulate the fluid through a fluid circuit. A hydraulic cylinder includes a rod and a first fluid port. The hydraulic cylinder is operable to extend and retract the rod to raise and lower the rear gate respectively. The fluid circuit includes a first portion connected to and disposed in fluid communication with the first fluid port. A flow bypass assembly is disposed in the first portion of the fluid circuit. The flow bypass assembly includes a first control valve, hereinafter referred to as the flow rate control valve, which is selectively moveable between a first position allowing fluid communication therethrough, and a second position blocking fluid communication therethrough. The flow bypass assembly further includes a bypass passageway connected to and disposed in fluid communication with the first portion of the fluid circuit on both sides of the flow rate control valve. The bypass passageway is operable to circulate the fluid therethrough to bypass the flow rate control valve when the flow rate control valve is disposed in the second position. A flow restriction is disposed within the bypass passageway.

In one aspect of the disclosure, the flow rate control valve is controllable into the first position of the flow rate control valve to direct fluid flow through the flow rate control valve to provide a first fluid flow rate through the first portion of the fluid circuit. Fluid flow through the first portion of the fluid circuit at the first fluid flow rate moves the rear gate at a first speed. The flow rate control valve is controllable into the second position of the flow rate control valve to direct fluid flow through the bypass passageway to provide a second fluid flow rate through the first portion of the fluid circuit. Fluid flow through the first portion of the fluid circuit at the second fluid flow rate moves the rear gate at a second speed. The second fluid flow rate and the second speed are less than the first fluid flow rate and the first speed respectively. As such, the speed of the rear gate, while both opening and closing, may be controlled between the first speed and the second speed by moving the flow rate control valve between the first position and the second position of the flow rate control valve. By slowing the speed of the rear gate, movement of the rear gate may be dampened at one or more intermediate positions. For example, as the rear gate nears the open position or the closed position, the speed of the rear gate may be slowed by moving the flow rate control valve from the first position into the second position, thereby slowing the rear gate to the second speed so that the rear gate does not slam open or closed respectively.

In one aspect of the disclosure, the flow rate control valve is a two-position valve normally biased into the first position. The flow rate control valve may include, but is not limited to, an internal hydraulic pilot actuated by a solenoid. The solenoid may be actuated by a controller to cause the flow rate control valve to move between the first position and the second position of the flow rate control valve.

In one aspect of the disclosure, the hydraulic cylinder may include a second fluid port, and the fluid circuit may include a second portion. The second portion of the fluid circuit is connected to and disposed in fluid communication with the second fluid port.

In one aspect of the disclosure, the hydraulic system may include a second control valve, hereinafter referred to as the flow direction control valve. The flow direction control valve is moveable between a first position and a second position. When disposed in the first position, the flow direction control valve connects the pump and the first portion of the fluid circuit in fluid communication. When disposed in the first position, the flow direction control valve connects the second portion of the fluid circuit and the tank in fluid communication. When disposed in the second position, the flow direction control valve connects the first portion of the fluid circuit and the tank in fluid communication. When disposed in the second position, the flow direction control valve connects the second portion of the fluid circuit and the pump in fluid communication.

In one aspect of the disclosure, the flow direction control valve may include a third position. When disposed in the third position, the flow direction control valve may directly connect the pump and the tank in fluid communication. Additionally, when the flow direction control valve is disposed in the third position, the flow direction control valve blocks fluid communication to both the first portion and the second portion of the fluid circuit from both the pump and the tank.

In one aspect of the disclosure, the flow direction control valve may include a three position valve that is normally biased into the third position. The flow direction control valve may be actuated by one or more solenoids controlled by a controller.

In one aspect of the disclosure, the flow direction control valve is controllable into the first position of the flow direction control valve to direct the fluid from the pump, through the first portion of the fluid circuit and into the first fluid port, while directing fluid from the second fluid port through the second portion of the fluid circuit to the tank to extend the rod and raise the rear gate. The flow direction control valve is controllable into the second position of the flow direction control valve to direct the fluid from the pump, through the second portion of the fluid circuit and into the second fluid port while directing fluid from the first fluid port through the first portion of the fluid circuit to the tank to retract the rod and lower the rear gate. With the flow direction control valve dispose din either the first position or the second position of the flow direction control valve, the flow rate control valve may be controlled between the first position and the second position of the flow rate control valve to move the rear gate at either the first speed or the second speed respectively, regardless of whether the rear gate is opening or closing, i.e., regardless of whether the hydraulic cylinder is extending or retracting.

In one aspect of the disclosure, a controller is disposed in communication with and operable to control movement of the flow rate control valve and the flow direction control valve. The controller is operable to control movement of the flow rate control valve between the first position of the flow rate control valve and the second position of the flow rate control valve. Similarly, the controller is operable to control movement of the flow direction control valve between the first position of the flow direction control valve and the second position of the flow direction control valve.

A baler implement is also provided. The baler implement includes a body forming a baling chamber, and a rear gate rotatably attached to the body. The rear gate is rotatable about a gate axis between a closed position, an open position, and at least one intermediate position disposed between the closed position and the open position. A tank is operable to store a supply of a fluid. A pump is disposed in fluid communication with the tank. The tank is operable to circulate the fluid through a fluid circuit. A hydraulic cylinder interconnects the body and the rear gate. The hydraulic cylinder includes a rod and a first fluid port. The hydraulic cylinder is operable to extend and retract the rod to raise and lower the rear gate respectively. The fluid circuit includes a first portion connected to and disposed in fluid communication with the first fluid port. A flow bypass assembly is disposed in the first portion of the fluid circuit. The flow bypass assembly includes a flow rate control valve selectively moveable between a first position allowing fluid communication therethrough, and a second position blocking fluid communication therethrough. The flow bypass assembly further includes a bypass passageway. The bypass passageway connects to and is disposed in fluid communication with the first portion of the fluid circuit, on both sides of the flow rate control valve. The bypass passageway is operable to circulate the fluid therethrough to bypass the flow rate control valve when the flow rate control valve is disposed in the second position. A flow restriction is disposed within the bypass passageway.

In one aspect of the disclosure, the hydraulic cylinder includes a second fluid port, and the fluid circuit includes a second portion connected to and disposed in fluid communication with the second fluid port. A flow direction control valve is moveable between a first position and a second position. When dispose dint eh first position, the flow direction control valve connects the pump and the first portion of the fluid circuit in fluid communication and connects the tank and the second portion of the fluid circuit in fluid communication. When disposed in the second position, the flow direction control valve connects the first portion of the fluid circuit and the tank in fluid communication and connects the second portion of the fluid circuit and the pump in fluid communication. The flow direction control valve may further include a third position. When disposed in the third position, the flow direction control valve directly connects the pump and the tank in fluid communication, and blocks fluid communication to both the first portion and the second portion of the fluid circuit from both the pump and the tank.

In one aspect of the disclosure, the baler implement includes a controller. The controller is disposed in communication with and operable to control movement of the flow rate control valve between the first position of the flow rate control valve and the second position of the flow rate control valve. Additionally, the controller may be disposed in communication with and operable to control movement of the flow direction control valve between at least the first position of the flow direction control valve and the second position of the flow direction control valve.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
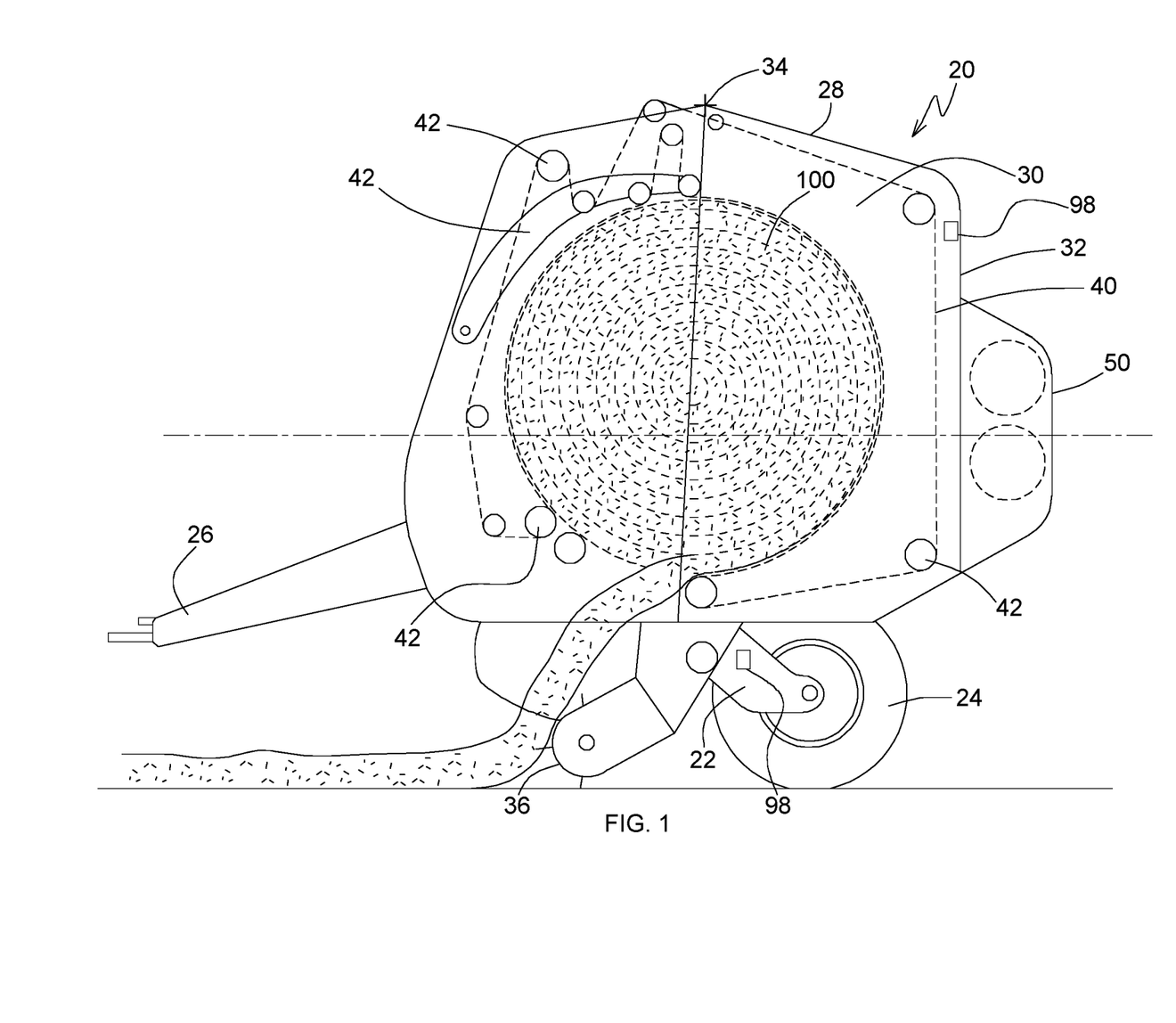
FIG. 1 is a schematic side view of a baler implement.

Referring to the Figures, wherein like numerals indicate like parts throughout the several views, a baler implement is generally shown at 20. The example implementation of the baler implement 20 shown in FIG. 1 is configured as a round baler. The teachings of the disclosure are described below with reference to the features of the example implementation of the baler implement 20 shown in FIG. 1, i.e., the round baler. However, it should be appreciated that the teachings of the disclosure may be applied to other implementations and/or configurations of the baler implement 20 not shown or described herein.

Referring to FIG. 1, the baler implement 20 includes a frame 22. One or more ground engaging elements 24, such as but not limited to one or more wheels and/or tracks, are attached to and rotatably supported by the frame 22. A tongue 26 may be coupled to the frame 22 at a forward end of the frame 22. A hitch arrangement may be included with the tongue 26. The hitch arrangement may be used to attach the baler implement 20 to a traction unit, such as but not limited to an agricultural tractor. In other implementations, the baler implement 20 may be self-propelled, in which case the traction unit and the baler implement 20 are configured as a single, self-propelled vehicle.

The baler implement 20 includes a housing or body 28 forming a baling chamber 30. The body 28 is attached to and supported by the frame 22. The body 28 may include one or more walls or panels that at least partially enclose and/or define the baling chamber 30. The baler implement 20 further includes a rear gate 32. The rear gate 32 is attached to and rotatably supported by the body 28. The rear gate 32 is positioned adjacent a rearward end of the frame 22 and is pivotably moveable about a gate axis 34. The gate axis 34 is generally horizontal and perpendicular to a central longitudinal axis of the frame 22. The rear gate 32 is moveable between a closed position for forming a bale 100 within the baling chamber 30, and an open position for discharging the bale 100 from the baling chamber 30. The rear gate 32 is further moveable to at least one intermediate position disposed between the open position and the closed position.

The baler implement 20 includes a pick-up 36 disposed proximate the forward end of the frame 22. The pickup gathers crop material from a ground surface and directs the gathered crop material toward and into an inlet of the baling chamber 30. The pickup may include, but is not limited to fines, forks, augers, conveyors, baffles, etc., for gathering and moving the crop material. The baler implement 20 may be equipped with a pre-cutter (not shown), disposed between the pickup and the inlet. As such, the pre-cutter is disposed downstream of the pickup and upstream of the inlet relative to a direction of travel of the crop material. The pre-cutter cuts or chops the crop material into smaller pieces.

The baler implement 20 may be configured as a variable chamber baler, or as a fixed chamber baler. The baler implement 20 shown in the Figures and described herein is depicted and described as a variable chamber baler. As is understood by those skilled in the art, the variable chamber baler includes a plurality of longitudinally extending side-by-side forming belts 40 that are supported by a plurality of rollers 42. The bale 100 is formed by the forming belts 40 and one or more side walls of the housing.

The crop material is directed through the inlet and into the baling chamber 30, whereby the forming belts 40 roll the crop material in a spiral fashion into the bale 100 having a cylindrical shape. The forming belts 40 apply a constant pressure to the crop material as the crop material is formed into the bale 100. A belt tensioner 44 continuously moves the forming belts 40 radially outward relative to a center of the cylindrical bale 100 as the diameter of the bale 100 increases. The belt tensioner 44 maintains the appropriate tension in the belts to obtain the desired density of the crop material. The belt tensioner 44 is moved by a first tension arm cylinder 46 and a second tension arm cylinder 48, both shown in FIGS. 2-6. The first tension arm cylinder 46 and the second tension arm cylinder 48 extend and retract in response to a hydraulic signal to move the belt tensioner 44.

The baler implement 20 includes a wrap system 50. The wrap system 50 is operable to wrap the bale 100 with a wrap material inside the baling chamber 30. Once the bale 100 is formed to a desired size, the wrap system 50 feeds the wrap material into the baling chamber 30 to wrap the bale 100 and thereby secure the crop material in a tight package and maintain the desired shape of the bale 100. The wrap material may include, but is not limited to, a twine, a net mesh, or a solid plastic wrap. Movement of the gate into the open position simultaneously moves the forming belts 40 clear of the formed bale 100, and allows the formed and wrapped bale 100 to be discharged through the rear of the baling chamber 30.

Figure 2:
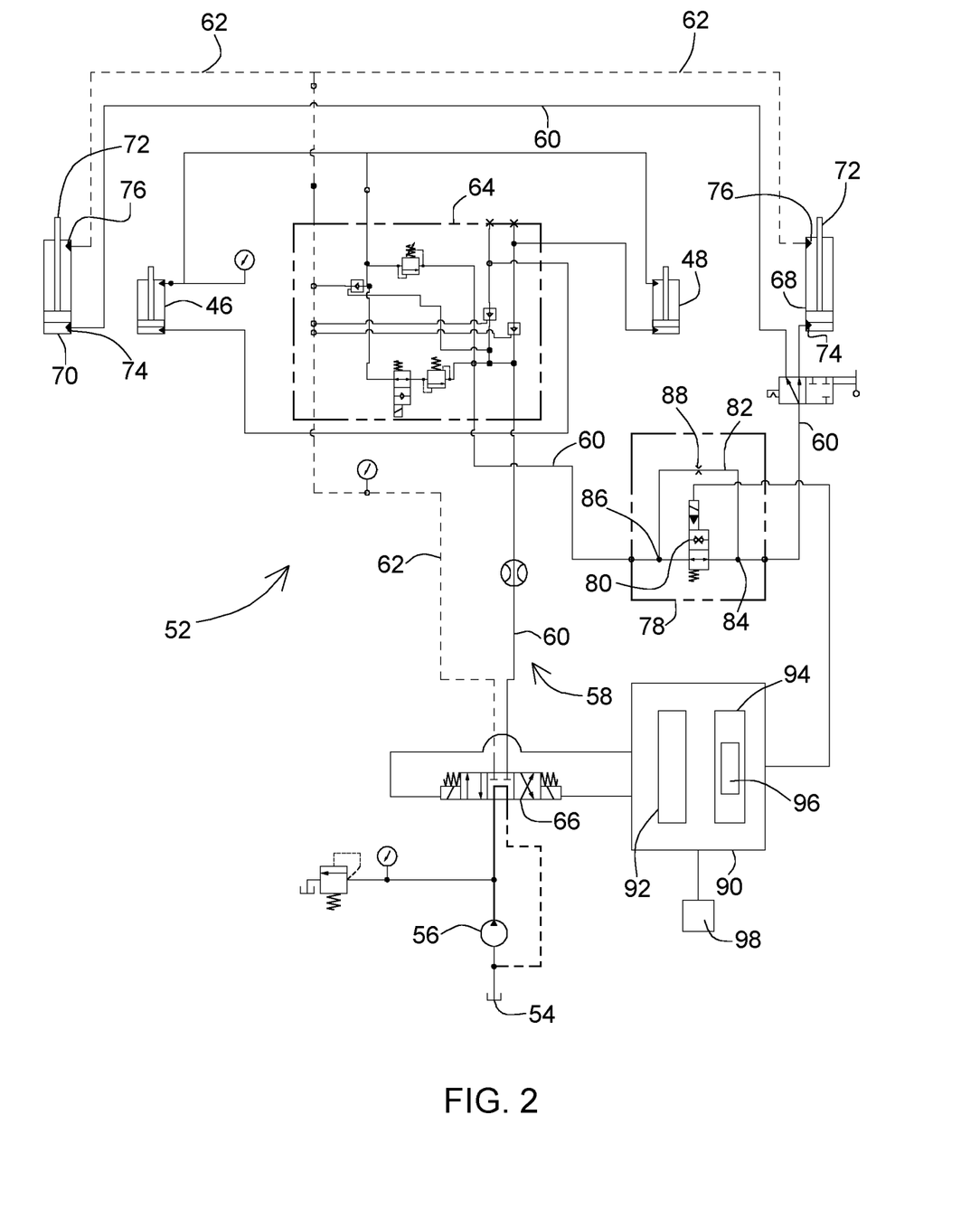
FIG. 2 is a schematic view of a hydraulic system for the baler implement.

Referring to FIG. 2, the baler implement 20 includes a hydraulic system 52. The hydraulic system 52 is configured to operate the rear gate 32 of the baler implement 20. It should be appreciated that the hydraulic system 52 may be configured to operate other features and/or functions of the baler implement 20, such as but not limited to the first tension arm cylinder 46 and the second tension arm cylinder 48.

The hydraulic system 52 includes a tank 54. The tank 54 is operable to store a supply of a fluid, e.g., hydraulic fluid. The tank 54 may alternatively be referred to as a reservoir or container capable of storing the supply of the fluid. A pump 56 is disposed in fluid communication with the tank 54. The pump 56 is operable to pressurize and/or circulate the fluid through a fluid circuit 58. The pump 56 draws the fluid from the tank 54 and circulates the fluid through the fluid circuit 58, through which the fluid is eventually returned to the tank 54. The specific type, configuration, and operation of the pump 56 are known to those skilled in the art, are not pertinent to the teachings of this disclosure, and are therefore not described in detail herein.

The fluid circuit 58 includes a plurality of fluid passageways or portions that are connected together. The fluid passageways may include and be defined by individual components or combinations of components, including but are not limited to, rigid pipes, flexible hoses, connections, fittings, valves, valve bodies, etc. The fluid circuit 58 includes at least a first portion 60 and a second portion 62, described in greater detail below. While the fluid circuit 58 may include other fluid passageways, such as those leading to and from a tension arm valve body 64, the first tension arm cylinder 46, or the second tension arm cylinder 48, these other fluid passageways are not pertinent to the teachings of this disclosure, and are therefore not described in detail herein.

The hydraulic system 52 includes a flow direction control valve 66. The flow direction control valve 66 may alternatively be referred to herein as the second control valve. The flow direction control valve 66 is moveable between a first position and a second position to control the direction of fluid flow through the first portion 60 and the second portion 62 of the fluid circuit 58. When the flow direction control valve 66 is disposed in its first position, the flow direction control valve 66 connects the pump 56 and the first portion 60 of the fluid circuit 58 in fluid communication and connects the tank 54 and the second portion 62 of the fluid circuit 58 in fluid communication. When the flow direction control valve 66 is disposed in its second position, the flow direction control valve 66 connects the first portion 60 of the fluid circuit 58 and the tank 54 in fluid communication and the second portion 62 of the fluid circuit 58 and the pump 56 in fluid communication.

As shown in FIG. 2, the flow direction control valve 66 further includes a third position. When the flow direction control valve 66 is disposed in its third position, the flow direction control valve 66 directly connects the pump 56 and the tank 54 in fluid communication and blocks fluid communication to both the first portion 60 and the second portion 62 of the fluid circuit 58 from both the pump 56 and the tank 54.

The flow direction control valve 66 may include a three-position spool valve or some other equivalent valve structure. In the implementation described herein, the flow direction control valve 66 is normally biased into the third position, or some other equivalent valve structure. The flow direction control valve 66 may include one or more electrically actuated solenoids and/or biasing devices, e.g., springs, to move the flow direction control valve 66 between the different positions of the flow direction control valve 66. It should be appreciated that other valve types and/or combination of valves may be used to provide the functionality of the flow direction control valve 66 described herein.

The baler implement 20 includes at least one hydraulic gate cylinder. As shown in FIGS. 2-5, the baler implement 20 includes a first hydraulic gate cylinder 68 and a second hydraulic gate cylinder 70. Each of the first hydraulic gate cylinder 68 and the second hydraulic gate cylinder 70 include a respective rod 72, a respective first fluid port 74, and a respective second fluid port 76. Additionally, each of the first hydraulic gate cylinder 68 and the second hydraulic gate cylinder 70 are operable to extend and retract their respective rods 72 to raise and lower the rear gate 32.

The first portion 60 of the fluid circuit 58 is connected to and disposed in fluid communication with the first fluid port 74 of each of the first hydraulic gate cylinder 68 and the second hydraulic gate cylinder 70. The second portion 62 of the fluid circuit 58 is connected to and disposed in fluid communication with the second fluid port 76 of each of the first hydraulic gate cylinder 68 and the second hydraulic gate cylinder 70. Pressurized fluid supplied to the first fluid ports 74 of the first and second hydraulic gate cylinders 68, 70 causes their respective rods 72 to extend, which in turn cause the rear gate 32 to move toward the open position. As the respective rods 72 of the first and second hydraulic gate cylinders 68, 70 extend, fluid is forced out of the first and second hydraulic gate cylinders 68, 70 through their respective second fluid ports 76 and back to the tank 54. Pressurized fluid supplied to the second fluid ports 76 of the first and second hydraulic gate cylinders 68, 70 causes their respective rods 72 to retract, which in turn causes the rear gate 32 to move toward the closed position. As the respective rods 72 of the first and second hydraulic gate cylinders 68, 70 retract, fluid is forced out of the first and second hydraulic gate cylinders 68, 70 through their respective first fluid ports 74 and back to the tank 54.

In the example implementation shown in the Figures, a flow bypass assembly 78 is disposed in the first portion 60 of the fluid circuit 58. However, in other implementations, the flow bypass assembly 78 may alternatively be disposed in the second portion 62 of the fluid circuit 58. The flow bypass assembly 78 includes a flow rate control valve 80 that is selectively moveable between a first position and a second position. The flow rate control valve 80 may alternatively be referred to herein as the first control valve. When the flow rate control valve 80 is disposed in its first position, the flow rate control valve 80 allows full fluid communication through the flow rate control valve 80. When the flow rate control valve 80 is disposed in its second position, the flow rate control valve 80 blocks fluid communication through the flow rate control valve 80.

In one implementation, the flow rate control valve 80 is a two-position spool valve or an equivalent valve assembly. In the implementation described herein, the flow rate control valve 80 is normally biased into its first position. The flow rate control valve 80 may include an electrically controlled solenoid that actuates an internal hydraulic pilot to move between the first and second position of the flow rate control valve 80. It should be appreciated that the flow rate control valve 80 may differ from the example implementation shown in the Figures and described herein. For example, the flow rate control valve 80 may include a proportional valve to vary the fluid flow rate therethrough. It should be appreciated that other valve types and/or combination of valves may be used to provide the functionality of the flow rate control valve 80 described herein.

The flow bypass assembly 78 further includes a bypass passageway 82. The bypass passageway 82 connects to and is disposed in fluid communication with the first portion 60 of the fluid circuit 58, on both sides of the flow rate control valve 80. As such, the bypass passageway 82 is connected to the first portion 60 of the fluid circuit 58 both at a first location 84 and a second location 86 of the flow rate control valve 80. The first location 84 and the second location 86 are attached to the first portion 60 of the fluid circuit 58 on opposing sides of the flow rate control valve 80. The bypass passageway 82 is operable to circulate the fluid therethrough to bypass the flow rate control valve 80 when the flow rate control valve 80 is disposed in the second position, i.e., the closed position. A flow restriction 88 may be disposed within the bypass passageway 82. The flow restriction 88 may include an orifice plate or some other equivalent structure capable of restricting the fluid flow through the bypass passageway 82 to a rate that is less than a fluid flow rate through the flow rate control valve 80 when disposed in its first position, i.e., the open position. For example, the flow restriction 88 may alternatively include a fluid passageway, e.g., hose or rigid pipe, having a smaller cross sectional area relative to the first portion 60 of the fluid circuit 58, thereby restricting fluid flow therethrough.

The baler implement 20 further includes a controller 90. The controller 90 is disposed in communication with and operable to control movement of the flow rate control valve 80 between the first position of the flow rate control valve 80 and the second position of the flow rate control valve 80. Additionally, the controller 90 is disposed in communication with and operable to control movement of the flow direction control valve 66 between at least the first position of the flow direction control valve 66 and the second position of the flow direction control valve 66. The controller 90 may be configured to send a control signal, such as but not limited to an electrical signal, to the flow rate control valve 80 and/or the flow direction control valve 66 to move each between their respective positions.

The controller 90 may alternatively be referred to as a computing device, a computer, a module, a control module, a control unit, etc. The controller 90 is operable to control the operation of the flow rate control valve 80 and the flow direction control valve 66. The controller 90 includes a processor 92, a memory 94, and all software, hardware, algorithms, connections, sensors, etc., necessary to manage and control the operation of the flow rate control valve 80 and the flow direction control valve 66. As such, a method may be embodied as a program or algorithm operable on the controller 90. It should be appreciated that the controller 90 may include any device capable of analyzing data from various sensors, comparing data, making the necessary decisions required to control the operation of the flow rate control valve 80 and the flow direction control valve 66, and executing the required tasks necessary to control the operation of the flow rate control valve 80 and the flow direction control valve 66.

The controller 90 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (ND) circuitry, digital-to-analog (D/A) circuitry, and any required input/output (I/O) circuitry, I/O devices, and communication interfaces, as well as signal conditioning and buffer electronics.

The computer-readable memory 94 may include any non-transitory/tangible medium which participates in providing data or computer-readable instructions. The memory 94 may be non-volatile or volatile. Non-volatile media may include, for example, optical or magnetic disks and other persistent memory. Example volatile media may include dynamic random access memory (DRAM), which may constitute a main memory. Other examples of embodiments for the memory 94 may include a floppy, flexible disk, or hard disk, magnetic tape or other magnetic medium, a CD-ROM, DVD, and/or any other optical medium, as well as other possible memory devices such as flash memory.

The controller 90 includes the tangible, non-transitory memory 94 on which are recorded computer-executable instructions, including a valve control algorithm 96. The processor 92 of the controller 90 is configured for executing the valve control algorithm 96. The valve control algorithm 96 implements a method of controlling the flow direction control valve 66 and the flow rate control valve 80.

The flow direction control valve 66 is controllable into the first position of the flow direction control valve 66 to extend the rods 72 and raise the rear gate 32. When disposed in its first position, the flow direction control valve 66 directs the fluid from the pump 56, through the first portion 60 of the fluid circuit 58 and into the first fluid ports 74 while directing fluid from the second fluid ports 76 through the second portion 62 of the fluid circuit 58 to the tank 54. The flow direction control valve 66 is controllable into the second position of the flow direction control valve 66 to retract the rods 72 and lower the rear gate 32. When disposed in its second position, the flow direction control valve 66 directs the fluid from the pump 56, through the second portion 62 of the fluid circuit 58 and into the second fluid ports 76 while directing fluid from the first fluid ports 74 through the first portion 60 of the fluid circuit 58 to the tank 54.

The flow rate control valve 80 is controllable into the first position of the flow rate control valve 80 to provide a first fluid flow rate through the first portion 60 of the fluid circuit 58 to move the rear gate 32 at a first speed. When disposed in its first position, the flow rate control valve 80 directs fluid flow through the flow rate control valve 80 at the first fluid rate. The flow rate control valve 80 is controllable into the second position of the flow rate control valve 80 to provide a second fluid flow rate through the first portion 60 of the fluid circuit 58 to move the rear gate 32 at a second speed. When the flow rate control valve 80 is disposed in its second position, the flow rate control valve 80 directs fluid flow through the bypass passageway 82 and through the flow restriction 88 at the second fluid flow rate. Because of the flow restriction 88, the second fluid flow rate and the second speed are less than the first fluid flow rate and the first speed respectively. The flow rate control valve 80 may be controlled to either its first position or its second position, regardless of the direction of fluid flow through the first portion 60 of the fluid circuit 58, i.e., regardless of whether the flow direction control valve 66 is disposed in its first position for raising the rear gate 32 or its second position for lowering the rear gate 32.

Figure 3:
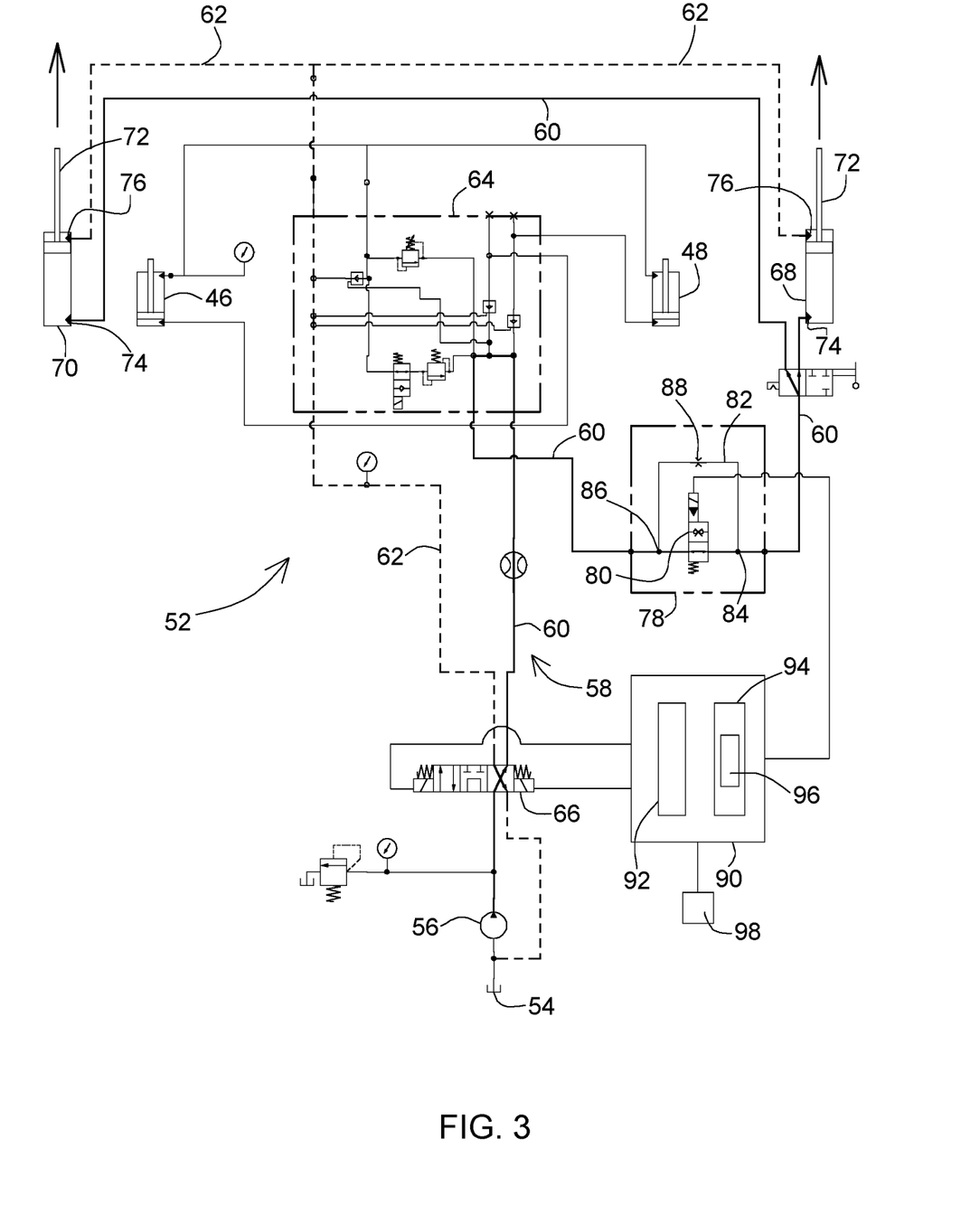
FIG. 3 is a schematic view of the hydraulic system in a first configuration.
Figure 4:
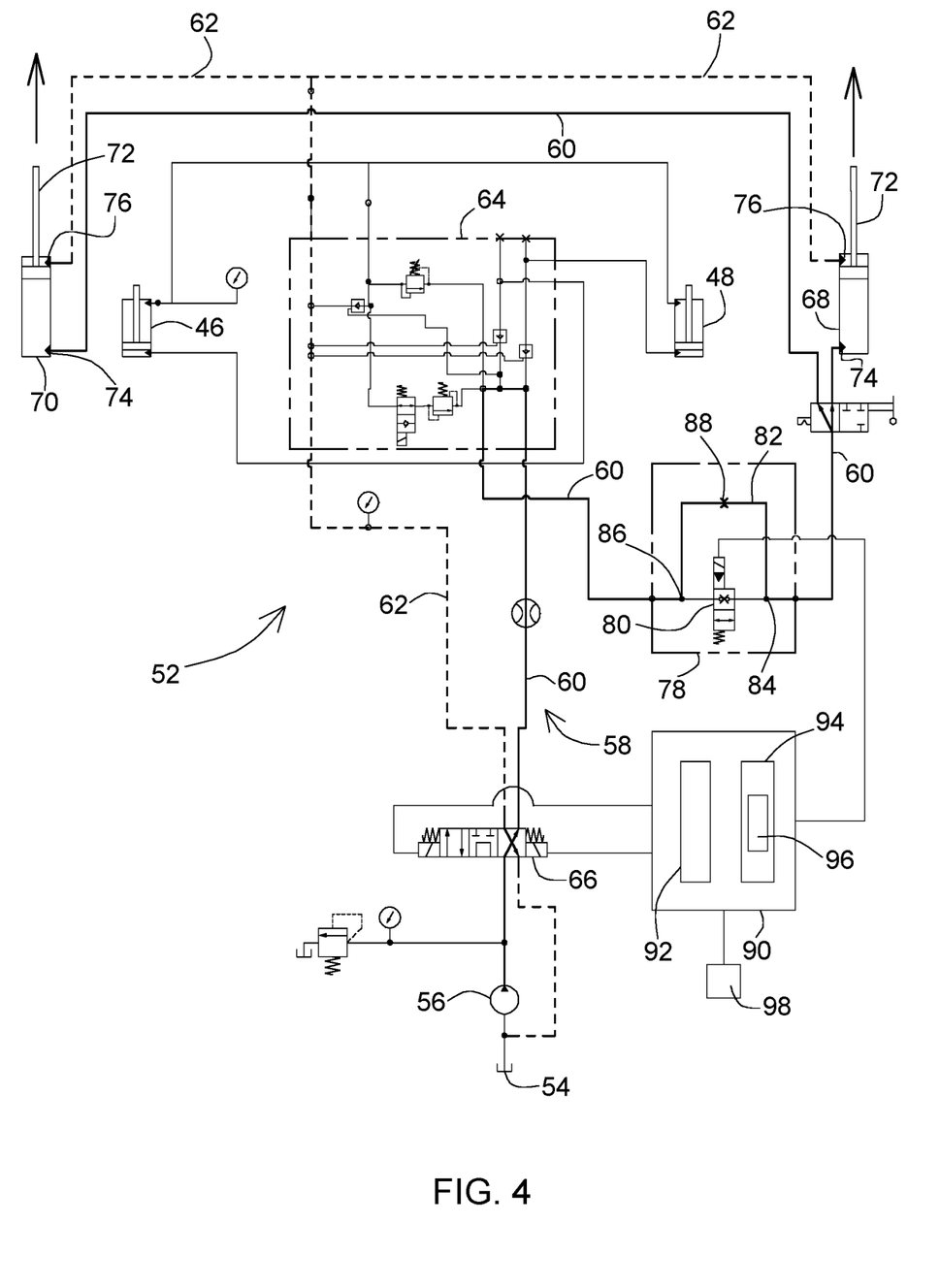
FIG. 4 is a schematic view of the hydraulic system in a second configuration.
Figure 5:
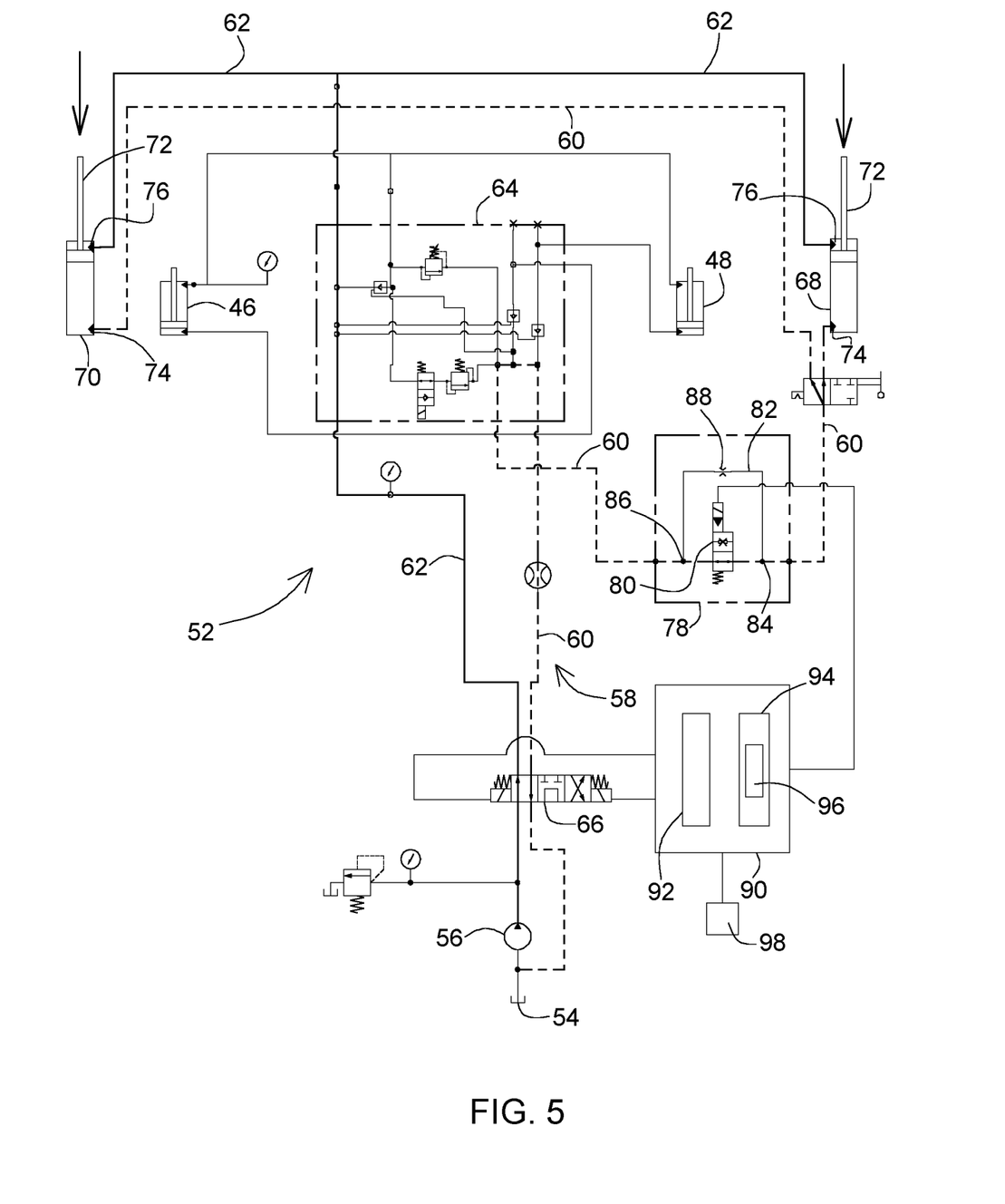
FIG. 5 is a schematic view of the hydraulic system in a third configuration.
Figure 6:
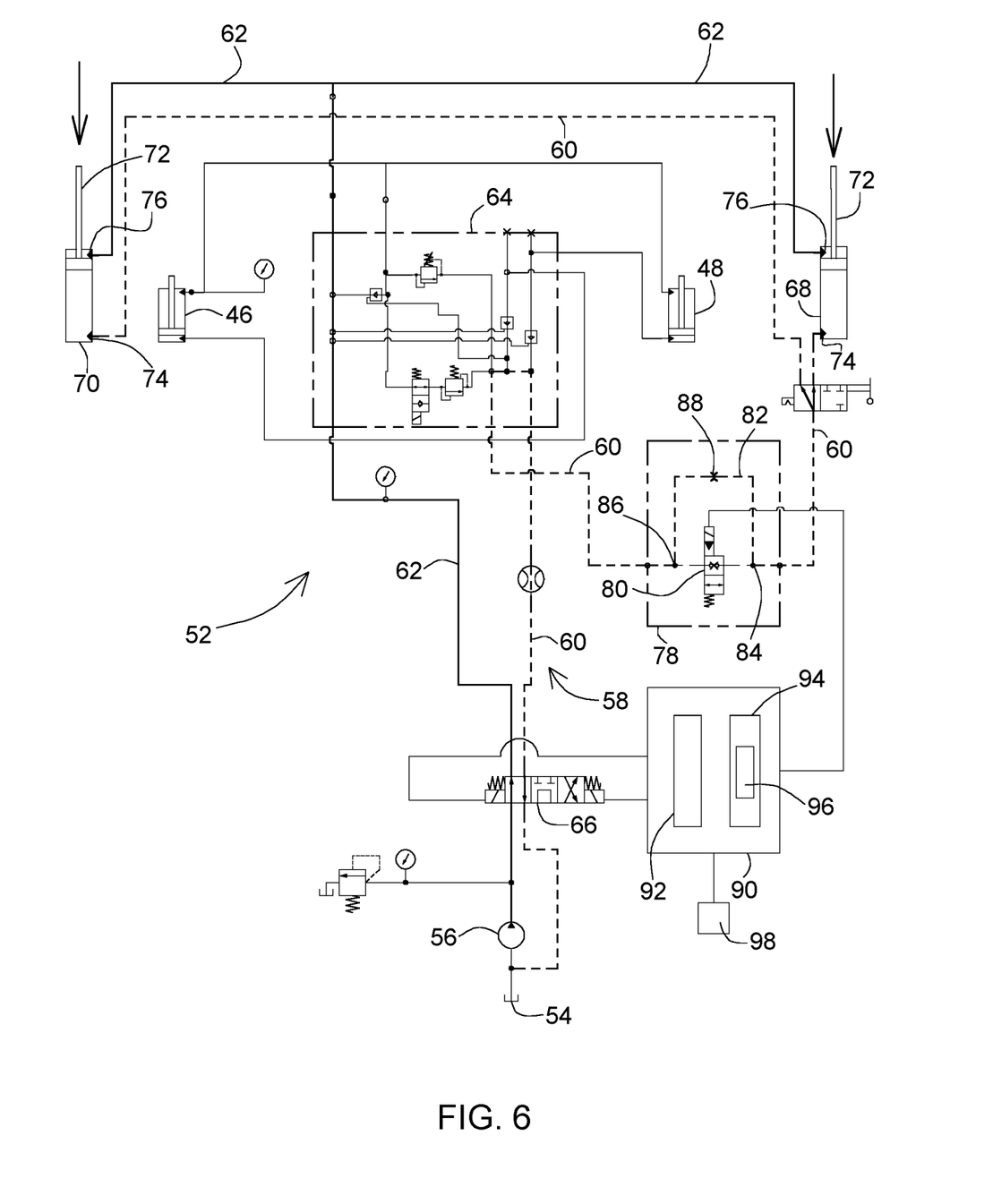
FIG. 6 is a schematic view of the hydraulic system in a fourth configuration.

FIGS. 3-6 show the hydraulic system 52 configured for different operations. Within FIGS. 3-6, pressurized fluid from the pump 56 is shown in thick solid lines, whereas fluid returning to tank 54 is shown in thick dashed lines. FIG. 3 shows the hydraulic system 52 in a first configuration, in which the hydraulic system 52 is configured to raise the rear gate 32 at a first speed. FIG. 4 shows the hydraulic system 52 in a second configuration, in which the hydraulic system 52 is configured to raise the rear gate 32 at a second speed. FIG. 5 shows the hydraulic system 52 in a third configuration, in which the hydraulic system 52 is configured to lower the rear gate 32 at a first speed. FIG. 6 shows the hydraulic system 52 in fourth configuration, in which the hydraulic system 52 is configured to lower the rear gate 32 at a second speed.

Referring to FIG. 3, the flow direction control valve 66 is shown controlled into the first position of the flow direction control valve 66, and the flow rate control valve 80 is shown controlled into the first position of the flow rate control valve 80. In this configuration, pressurized fluid from the pump 56 is directed through the first portion 60 of the fluid circuit 58 to the first fluid ports 74 of the first and second hydraulic gate cylinders 68, 70. Fluid from the second fluid ports 76 of the first and second hydraulic gate cylinders 68, 70 is directed through the second portion 62 of the fluid circuit 58 back to the tank 54. The flow rate control valve 80 is positioned in its first position, such that the fluid moving through the first portion 60 of the fluid circuit 58 moves directly through the flow rate control valve 80 at the first fluid flow rate. Since the flow rate control valve 80 is open, no or only a negligible amount of fluid flows through the bypass passageway 82, fluid flow through the bypass passageway 82 being limited by the flow restriction 88. In this configuration, the rear gate 32 is moved toward the open position at the first speed.

Referring to FIG. 4, the flow direction control valve 66 is shown controlled into the first position of the flow direction control valve 66, and the flow rate control valve 80 is shown controlled into the second position of the flow rate control valve 80. In this configuration, pressurized fluid from the pump 56 is directed through the first portion 60 of the fluid circuit 58 to the first fluid ports 74 of the first and second hydraulic gate cylinders 68, 70. Fluid from the second fluid ports 76 of the first and second hydraulic gate cylinders 68, 70 is directed through the second portion 62 of the fluid circuit 58 back to the tank 54. The flow rate control valve 80 is positioned in its second position, such that the fluid moving through the first portion 60 of the fluid circuit 58 is blocked by the flow rate control valve 80, and is therefore forced through the bypass passageway 82 and the flow restriction 88 included therein at the second fluid flow rate. In this configuration, the rear gate 32 is moved toward the open position at the second speed.

Referring to FIG. 5, the flow direction control valve 66 is shown controlled into the second position of the flow direction control valve 66, and the flow rate control valve 80 is shown controlled into the first position of the flow rate control valve 80. In this configuration, pressurized fluid from the pump 56 is directed through the second portion 62 of the fluid circuit 58 to the second fluid ports 76 of the first and second hydraulic gate cylinders 68, 70. Fluid from the first fluid ports 74 of the first and second hydraulic gate cylinders 68, 70 is directed through the first portion 60 of the fluid circuit 58 back to the tank 54. The flow rate control valve 80 is positioned in its first position, such that the fluid moving through the first portion 60 of the fluid circuit 58 moves directly through the flow rate control valve 80 at the first fluid flow rate. Since the flow rate control valve 80 is open, no or only a negligible amount of fluid flows through the bypass passageway 82, fluid flow through the bypass passageway 82 being limited by the flow restriction 88. In this configuration, the rear gate 32 is moved toward the closed position at the first speed.

Referring to FIG. 6, the flow direction control valve 66 is shown controlled into the second position of the flow direction control valve 66, and the flow rate control valve 80 is shown controlled into the second position of the flow rate control valve 80. In this configuration, pressurized fluid from the pump 56 is directed through the second portion 62 of the fluid circuit 58 to the second fluid ports 76 of the first and second hydraulic gate cylinders 68, 70. Fluid from the first fluid ports 74 of the first and second hydraulic gate cylinders 68, 70 is directed through the first portion 60 of the fluid circuit 58 back to the tank 54. The flow rate control valve 80 is positioned in its second position, such that the fluid moving through the first portion 60 of the fluid circuit 58 is blocked by the flow rate control valve 80, and is therefore forced through the bypass passageway 82 and the flow restriction 88 included therein at the second fluid flow rate. In this configuration, the rear gate 32 is moved toward the closed position at the second speed.

The flow direction control valve 66 and the flow rate control valve 80 may be controlled into the different configurations described above during different phases of various operations of the baler implement 20. For example, while opening the rear gate 32, the flow direction control valve 66 and the flow rate control valve 80 may be initially controlled into the first configuration shown in FIG. 3 through most of the travel of the rear gate 32 to move the rear gate 32 at the first speed, and then controlled into the second configuration shown in FIG. 4 through the remainder of the travel of the rear gate 32 to slow the speed of the rear gate 32 and move the rear gate 32 into the open position at a slower speed to prevent slamming the rear gate 32 open. Similarly, while closing the rear gate 32, the flow direction control valve 66 and the flow rate control valve 80 may be initially controlled into the third configuration shown in FIG. 5 through most of the travel of the rear gate 32 to move the rear gate 32 at the first speed, and then controlled into the fourth configuration shown in FIG. 6 through the remainder of the travel of the rear gate 32 to slow the speed of the rear gate 32 and move the rear gate 32 into the closed position at a slower speed to prevent slamming the rear gate 32 closed.

In other implementations, the rear gate 32 may be slowed and then stopped, while either opening or closing the rear gate 32, at an intermediate position between the open position and the closed position. For example, while opening the rear gate 32 from the closed position, the flow direction control valve 66 and the flow rate control valve 80 may be initially controlled into the first configuration shown in FIG. 3 through most of the travel of the rear gate 32 to move the rear gate 32 at the first speed, and then controlled into the second configuration shown in FIG. 4 for a period to slow the speed of the rear gate 32, at which time the rear gate 32 may be stopped at an intermediate position by controlling the flow direction control valve 66 into its third position, thereby allowing the baler implement 20 to execute another function, such as but not limited to weighing the bale 100 for example, engaging a push bar, or tightening the tension belts. After in order to move the rear gate 32 from the intermediate position toward the open position, the flow direction control valve 66 and the flow rate control valve 80 may be initially controlled into the first configuration shown in FIG. 3 through most of the travel of the rear gate 32 to move the rear gate 32 at the first speed, and then controlled into the second configuration shown in FIG. 4 through the remainder of the travel of the rear gate 32 to slow the speed of the rear gate 32 and move the rear gate 32 into the open position at a slower speed to prevent slamming the rear gate 32 open.

As described above, the processor 92 of the controller 90 is configured for executing the valve control algorithm 96. The valve control algorithm 96 implements the method of controlling the flow direction control valve 66 and the flow rate control valve 80 in order to control the rear gate 32. The controller 90 may communicate with one or more sensors 98. The sensors provide data to the controller 90 related to at least one characteristic of the bale 100. The characteristic of the bale 100 may include, but is not limited to, a position of the bale 100 relative to the baling chamber 30 and/or the rear gate 32, a position of the rear gate 32 relative to the bale 100, a weight of the bale 100, a size of the bale 100, a formation status of the bale 100, a status of the wrap system 50, etc. The controller 90 may initiate at least one of a plurality of different gate control modes to control the rear gate 32 based on the data related to the characteristic of the bale 100.

Initially, the controller 90 may determine if the bale 100 that is disposed within the baling chamber 30 is ready to be discharged from the baling chamber 30, or if the bale 100 disposed within the baling chamber 30 is not ready to be discharged from the baling chamber 30. Generally, the bale 100 is ready to be discharged from the baling chamber 30 when the bale 100 is formed to a desired size and density, and has been wrapped with the wrap material. The controller 90 may make the determination on whether the bale 100 is ready to be discharged based on data from one or more of the sensors 98, such as but not limited to a position of the forming belts 40 or a sensor that in some way indicates the size of the bale 100. Once the controller 90 determines the status of the bale 100, i.e., that the bale 100 is ready to be discharged, the controller 90 may then implement one or more control modes, either individually or in a combination, to discharge the bale 100 from the baling chamber 30.

The controller 90 may initiate a first gate control mode for opening the gate 32 at a first gate speed when the bale 100 is ready to be discharged from the baling chamber 30. When the first gate control mode is initiated, the controller 90 positions the flow direction control valve 66 in its first position and the flow rate control valve 80 in its first position. As described above, the first position of the flow direction control valve 66 directs fluid flow from the pump 56 to the first fluid ports 74, and returns fluid from the second fluid ports 76 to the tank 54. As described above, the first position of the flow rate control valve 80 directs fluid flow directly through the flow rate control valve 80 at the first flow rate to move the rear gate 32 at the first gate speed. By initiating the first gate control mode, the rear gate 32 is moved from the closed position into the open position at the first gate speed.

Alternatively, or subsequent to initiating the first gate control mode, the controller 90 may initiate a second gate control mode for opening the gate 32 at a second gate speed. The controller 90 may implement the second gate control mode to provide one or more different functions. For example, the controller 90 may implement the second gate control mode to dampen inertia of the rear gate 32 as the rear gate 32 nears the open position, or may implement the second gate control mode to dampen inertia of the rear gate 32 near an intermediate position, disposed somewhere between the open position and the closed position. Additionally, the controller 90 may implement the second gate control mode to slow the movement and/or force applied by a bale 100 push bar to discharge the bale 100 from the baling chamber 30. The controller 90 may implement the second gate control mode based on a location of the rear gate 32 and/or a time interval and may be based upon the data from one or more of the sensors 98, e.g., data related to a position of the rear gate 32. When the second gate control mode is initiated, the controller 90 positions the flow direction control valve 66 in its first position and the flow rate control valve 80 in its second position. As described above, the first position of the flow direction control valve 66 directs fluid flow from the pump 56 to the first fluid ports 74, and returns fluid from the second fluid ports 76 to the tank 54. As described above, the second position of the flow rate control valve 80 directs fluid flow through the flow restriction 88 at the second flow rate, which is less than the first flow rate, to move the rear gate 32 at the second gate speed, which is less than the first gate speed. By initiating the second gate control mode, the rear gate 32 is moved from the closed position toward the open position at the second gate speed.

Prior to implementing the first gate control mode and/or the second gate control mode, if the controller 90 determines that the bale 100 within the baling chamber 30 is not ready to be discharged, then the controller 90 may initiate a third gate control mode for maintaining the position of the gate 32 in the closed position. When the controller 90 implements the third gate control mode, the controller 90 positions or maintains the flow direction control valve 66 it its third position. The flow rate control valve 80 may be positioned in either its first position or its second position. As described above, when the flow direction control valve 66 is positioned in its third position, the fluid flow from the pump 56 is connected to circulate directly back to the tank 54. The first portion 60 and the second portion 62 of the fluid circuit 58 are closed, thereby preventing fluid flow out of or into either of the first fluid ports 74 and/or the second fluid ports 76, thereby maintaining the position of the first and second hydraulic gate cylinders 68 and 70, and maintaining the rear gate 32 in its closed position.

Subsequent to the implementing the first gate control mode and/or the second gate control mode, the controller 90 may implement a fourth gate control mode to position and hold the gate 32 in an intermediate position, the intermediate position disposed between the closed position and the open position. The controller 90 may implement the fourth gate control mode to maintain the rear gate 32 in the intermediate position to allow other functions of the baler implement 20 to complete, or to enable additional functions of the baler implement 20 to be executed. The additional functions of the baler implement 20 may include, but are not limited to, measuring the weight of the bale 100 with the rear gate 32 partially opened and held in place at the intermediate position and the bale 100 partially discharged from the baling chamber 30. When the controller 90 implements the fourth gate control mode, the controller 90 may first implement the first gate control mode and/or the second gate control mode, and then position the flow direction control valve 66 in its third position. The flow rate control valve 80 may be positioned in either its first position or its second position. As described above, when the flow direction control valve 66 is positioned in its third position, the fluid flow from the pump 56 is connected to circulate directly back to the tank 54. The first portion 60 and the second portion 62 of the fluid circuit 58 are closed, thereby preventing fluid flow out of or into either of the first fluid ports 74 and/or the second fluid ports 76, thereby maintaining the position of the first and second hydraulic gate cylinders 68 and 70, and maintaining the rear gate 32 in the intermediate position.

Subsequent to moving the rear gate 32 into the open position, the controller 90 may initiate a fifth gate control mode for maintaining the position of the gate in the open position when the bale 100 within the baling chamber 30 is being discharged. When the controller 90 implements the fifth gate control mode, the controller 90 positions the flow direction control valve 66 it its third position with the gate in its open position. The flow rate control valve 80 may be positioned in either its first position or its second position. As described above, when the flow direction control valve 66 is positioned in its third position, the fluid flow from the pump 56 is connected to circulate directly back to the tank 54. The first portion 60 and the second portion 62 of the fluid circuit 58 are closed, thereby preventing fluid flow out of or into either of the first fluid ports 74 and/or the second fluid ports 76, thereby maintaining the position of the first and second hydraulic gate cylinders 68 and 70, and maintaining the rear gate 32 in the open position.

The controller 90 may initiate a sixth gate control mode for closing the gate 32 at the first gate speed after the bale 100 has been discharged from the baling chamber 30. When the sixth gate control mode is initiated, the controller 90 positions the flow direction control valve 66 in its second position and the flow rate control valve 80 in its first position. As described above, the second position of the flow direction control valve 66 directs fluid flow from the pump 56 to the second fluid ports 76, and returns fluid from the first fluid ports 76 to the tank 54. As described above, the first position of the flow rate control valve 80 directs fluid flow directly through the flow rate control valve 80 at the first flow rate to move the rear gate 32 at the first gate speed. By initiating the sixth gate control mode, the rear gate 32 is moved from the open position into the closed position at the first gate speed.

Alternatively, or subsequent to initiating the sixth gate control mode, the controller 90 may initiate a seventh gate control mode for closing the gate 32 at the second gate speed. The controller 90 may implement the seventh gate control mode to provide one or more different functions. For example, the controller 90 may implement the second gate control mode to dampen inertia of the rear gate 32 as the rear gate 32 nears the closed position, or may implement the second gate control mode to dampen inertia of the rear gate 32 near an intermediate position, disposed somewhere between the open position and the closed position. The controller 90 may implement the seventh gate control mode based on a location of the rear gate 32 and/or a time interval and may be based upon the data from one or more of the sensors 98, e.g., data related to a position of the rear gate 32. When the seventh gate control mode is initiated, the controller 90 positions the flow direction control valve 66 in its second position and the flow rate control valve 80 in its second position. As described above, the second position of the flow direction control valve 66 directs fluid flow from the pump 56 to the second fluid ports 76, and returns fluid from the first fluid ports 74 to the tank 54. As described above, the second position of the flow rate control valve 80 directs fluid flow through the flow restriction 88 at the second flow rate, which is less than the first flow rate, to move the rear gate 32 at the second gate speed, which is less than the first gate speed. By initiating the seventh gate control mode, the rear gate 32 is moved from the open position toward the closed position at the second gate speed.

It should be appreciated that the different gate control modes described above may be combined in sequences that vary form those described above, in order to implement or perform various functions and/or operations of the baler implement. Additionally, it should be appreciated that the baler implement may include additional gate control modes not described herein.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A hydraulic system for operating a rear gate of a baler implement, the hydraulic system comprising:
   a tank operable to store a supply of a fluid;
   a pump disposed in fluid communication with the tank and operable to circulate the fluid through a fluid circuit;
   a hydraulic cylinder having a rod and a first fluid port, wherein the hydraulic cylinder is operable to extend and retract the rod to raise and lower the rear gate respectively;
   wherein the fluid circuit includes a first portion connected to and disposed in fluid communication with the first fluid port;
   a flow bypass assembly disposed in the first portion of the fluid circuit, wherein the flow bypass assembly includes:
   a first control valve selectively moveable between a first position allowing fluid communication therethrough, and a second position blocking fluid communication therethrough;
   a bypass passageway connected to and disposed in fluid communication with the first portion of the fluid circuit on both sides of the first control valve, and operable to circulate the fluid therethrough to bypass the first control valve when the first control valve is disposed in the second position; and
   a flow restriction disposed within the bypass passageway.

2. The hydraulic system set forth in claim 1, wherein the first control valve is controllable into the first position of the first control valve to direct fluid flow through the first control valve to provide a first fluid flow rate through the first portion of the fluid circuit to move the rear gate at a first speed, and wherein the first control valve is controllable into the second position of the first control valve to direct fluid flow through the bypass passageway to provide a second fluid flow rate through the first portion of the fluid circuit to move the rear gate at a second speed, wherein the second fluid flow rate and the second speed are less than the first fluid flow rate and the first speed respectively.

3. The hydraulic system set forth in claim 1, further comprising a second control valve moveable between a first position connecting the pump and the first portion of the fluid circuit in fluid communication, and a second position connecting the first portion of the fluid circuit and the tank in fluid communication.

4. The hydraulic system set forth in claim 3, wherein the hydraulic cylinder includes a second fluid port, and the fluid circuit includes a second portion connected to and disposed in fluid communication with the second fluid port.

5. The hydraulic system set forth in claim 4, wherein the second control valve connects the second portion of the fluid circuit and the tank when disposed in the first position, and wherein the second control valve connects the second portion of the fluid circuit and the pump in fluid communication when disposed in the second position.

6. The hydraulic system set forth in claim 5, wherein the second control valve is controllable into the first position of the second control valve to direct the fluid from the pump, through the first portion of the fluid circuit and into the first fluid port while directing fluid from the second fluid port through the second portion of the fluid circuit to the tank to extend the rod and raise the rear gate, and wherein the second control valve is controllable into the second position of the second control valve to direct the fluid from the pump, through the second portion of the fluid circuit and into the second fluid port while directing fluid from the first fluid port through the first portion of the fluid circuit to the tank to retract the rod and lower the rear gate.

7. The hydraulic system set forth in claim 4, wherein the second control valve includes a third position directly connecting the pump and the tank in fluid communication, and wherein the third position of the second control valve blocks fluid communication to both the first portion and the second portion of the fluid circuit from both the pump and the tank.

8. The hydraulic system set forth in claim 3, further comprising a controller disposed in communication with and operable to control movement of the first control valve between the first position of the first control valve and the second position of the first control valve.

9. The hydraulic system set forth in claim 8, wherein the controller is disposed in communication with and operable to control movement of the second control valve between the first position of the second control valve and the second position of the second control valve.

10. A hydraulic system for operating a rear gate of a baling implement, the hydraulic system comprising:
    a tank operable to store a supply of a fluid;
    a pump disposed in fluid communication with the tank and operable to circulate the fluid through a fluid circuit;
    a hydraulic cylinder having a rod, a first fluid port and a second fluid port, wherein the hydraulic cylinder is operable to extend and retract the rod to raise and lower the rear gate respectively;
    wherein the fluid circuit includes a first portion connected to and disposed in fluid communication with the first fluid port, and a second portion connected to and disposed in fluid communication with the second fluid port;
    a second control valve moveable between a first position connecting the pump and the first portion of the fluid circuit in fluid communication and connecting the tank and the second portion of the fluid circuit in fluid communication, and a second position connecting the first portion of the fluid circuit and the tank in fluid communication and connecting the second portion of the fluid circuit and the pump in fluid communication;
    a flow bypass assembly disposed in the first portion of the fluid circuit, wherein the flow bypass assembly includes:
    a first control valve selectively moveable between a first position allowing fluid communication therethrough, and a second position blocking fluid communication therethrough;
    a bypass passageway connected to and disposed in fluid communication with the first portion of the fluid circuit on both sides of the first control valve, and operable to circulate the fluid therethrough to bypass the first control valve when the first control valve is disposed in the second position; and
    a flow restriction disposed within the bypass passageway.

11. The hydraulic system set forth in claim 10, wherein the second control valve includes a third position directly connecting the pump and the tank in fluid communication, and wherein the third position of the second control valve blocks fluid communication to both the first portion and the second portion of the fluid circuit from both the pump and the tank.

12. The hydraulic system set forth in claim 11, wherein the second control valve is normally biased into the third position.

13. The hydraulic system set forth in claim 10, further comprising a controller, wherein the controller is disposed in communication with and operable to control movement of the first control valve between the first position of the first control valve and the second position of the first control valve, and wherein the controller is disposed in communication with and operable to control movement of the second control valve between at least the first position of the second control valve and the second position of the second control valve.

14. A baler implement comprising:
a body forming a baling chamber;
a rear gate rotatably attached to the body and rotatable about a gate axis between a closed position, an open position, and at least one intermediate position disposed between the closed position and the open position;
a tank operable to store a supply of a fluid;
a pump disposed in fluid communication with the tank and operable to circulate the fluid through a fluid circuit;
a hydraulic cylinder interconnecting the body and the rear gate and having a rod and a first fluid port, wherein the hydraulic cylinder is operable to extend and retract the rod to raise and lower the rear gate respectively;
wherein the fluid circuit includes a first portion connected to and disposed in fluid communication with the first fluid port;
a flow bypass assembly disposed in the first portion of the fluid circuit, wherein the flow bypass assembly includes:
a first control valve selectively moveable between a first position allowing fluid communication therethrough, and a second position blocking fluid communication therethrough;
a bypass passageway connected to and disposed in fluid communication with the first portion of the fluid circuit on both sides of the first control valve, and operable to circulate the fluid therethrough to bypass the first control valve when the first control valve is disposed in the second position; and
a flow restriction disposed within the bypass passageway.

15. The baler implement set forth in claim 14, wherein the hydraulic cylinder includes a second fluid port, and the fluid circuit includes a second portion connected to and disposed in fluid communication with the second fluid port.

16. The baler implement set forth in claim 15, further comprising a second control valve moveable between a first position connecting the pump and the first portion of the fluid circuit in fluid communication and connecting the tank and the second portion of the fluid circuit in fluid communication, a second position connecting the first portion of the fluid circuit and the tank in fluid communication and connecting the second portion of the fluid circuit and the pump in fluid communication, and a third position directly connecting the pump and the tank in fluid communication, and blocking fluid communication to both the first portion and the second portion of the fluid circuit from both the pump and the tank.

17. The baler implement set forth in claim 14, further comprising a controller, wherein the controller is disposed in communication with and operable to control movement of the first control valve between the first position of the first control valve and the second position of the first control valve, and wherein the controller is disposed in communication with and operable to control movement of the second control valve between at least the first position of the second control valve and the second position of the second control valve.

18. A baler implement comprising:
a housing;
a gate rotatably coupled to the housing and moveable relative to the housing between a closed position and an open position, wherein the housing and the gate cooperate to define a baling chamber;
a tank operable to store a supply of a fluid;
a pump disposed in fluid communication with the tank and operable to circulate the fluid through a fluid circuit;
a hydraulic cylinder attached to the gate and having a first fluid port and a second fluid port, wherein the hydraulic cylinder is operable to extend and retract to raise and lower the gate respectively;
wherein the fluid circuit includes a first portion connected to and disposed in fluid communication with the first fluid port, and a second portion connected to and disposed in fluid communication with the second fluid port;
a second control valve moveable between a first position connecting the pump and the first portion of the fluid circuit in fluid communication and connecting the tank and the second portion of the fluid circuit in fluid communication, a second position connecting the first portion of the fluid circuit and the tank in fluid communication and connecting the second portion of the fluid circuit and the pump in fluid communication, and a third position directly connecting the pump and the tank in fluid communication and blocking both the first portion and the second portion of the fluid circuit from both the pump and the tank;
a flow bypass assembly disposed in the first portion of the fluid circuit, wherein the flow bypass assembly includes:
a first control valve selectively moveable between a first position allowing fluid communication therethrough, and a second position blocking fluid communication therethrough;
a bypass passageway connected to and disposed in fluid communication with the first portion of the fluid circuit on both sides of the first control valve, and operable to circulate the fluid therethrough to bypass the first control valve when the first control valve is disposed in the second position; and
a flow restriction disposed within the bypass passageway;
a controller in communication with the first control valve and the second control valve, and including a processor and a memory having valve control algorithm stored thereon, wherein the processor is operable to execute the valve control algorithm to:
determine if a bale disposed within the baling chamber is ready to be discharged from the baling chamber; and
initiate a first gate control mode for opening the gate at a first gate speed when the bale is ready to be discharged from the baling chamber, wherein the first gate control mode positions the second control valve in its first position and the first control valve in its first position.

19. The baler implement set forth in claim 18, wherein the processor is operable to execute the valve control algorithm to initiate a second gate control mode for opening the gate at a second gate speed, wherein the second gate control mode positions the second control valve in its first position and the first control valve in its second position.

20. The baler implement set forth in claim 18, wherein the processor is operable to execute the valve control algorithm to initiate a third gate control mode for maintaining the position of the gate in the closed position when the bale within the baling chamber is not ready to be discharged, wherein the third gate control mode positions the second control valve it its third position.

21. The baler implement set forth in claim 18, wherein the processor is operable to execute the valve control algorithm to initiate a fourth gate control mode to position and hold the gate in an intermediate position between the closed position and the open position, wherein the fourth gate control mode executes the first control mode and then positions the second control valve in its third position.

22. The baler implement set forth in claim 18, wherein the processor is operable to execute the valve control algorithm to initiate a fifth gate control mode for maintaining the position of the gate in the open position when the bale within the baling chamber is being discharged, wherein the fifth gate control mode positions the second control valve it its third position with the gate in its open position.

23. The baler implement set forth in claim 18, wherein the processor is operable to execute the valve control algorithm to initiate a sixth gate control mode for closing the gate at a first gate speed after the bale has been discharged from the baling chamber, wherein the sixth gate control mode positions the second control valve in its second position and the first control valve in its first position.

24. The baler implement set forth in claim 18, wherein the processor is operable to execute the valve control algorithm to initiate a seventh gate control mode for opening the gate at a second gate speed, wherein the second gate control mode positions the second control valve in its second position and the first control valve in its second position.

25. The baler implement set forth in claim 18, further comprising at least one sensor disposed in communication with the controller and operable to provide data to the controller related to at least on characteristic of the bale, and wherein the processor is operable to execute the valve control algorithm to initiate at least one of a plurality of different gate control modes to control the gate based on the data related to the at least one characteristic of the bale.

26. The baler implement set forth in claim 25, wherein the at least one sensor includes at least one position sensor operable to sense a position of the bale relative to the baling chamber.

\* \* \* \* \*